3,360,576
IODINATIVE DEHYDROGENATION PROCESS
Thomas A. Rodgers, La Porte, Tex., assignor to Shell Oil Company, New York, N.Y., a corporation of Delaware
No Drawing. Filed Mar. 30, 1964, Ser. No. 355,903
2 Claims. (Cl. 260—656)

ABSTRACT OF THE DISCLOSURE

Unsaturated organic iodides in admixture with dienes and/or alkyl benzenes, obtained by iodinative conversion of hydrocarbons with iodine above 300° C., are stabilized against decomposition by the addition thereto of ammonia or an aliphatic amine.

---

This invention relates to an improved process for the iodinative dehydrogenation of organic compounds. More particularly, it relates to the stabilization and separation of the iodine-containing product stream obtained from an iodinative dehydrogenation reaction.

Maxwell Nager, in U.S. 3,080,435, proposes to dehydrogenate organic compounds by a process involving: (1) iodinative dehydrogenation of an organic compound by reaction with elemental iodine in a molten metal iodide environment to produce a dehydrogenated compound and hydrogen iodide, (2) immediately producing a metal iodide by reaction of the produced hydrogen iodide with the corresponding metal oxide or hydroxide in the dehydrogenation zone, and (3) regenerating elemental iodine of the metal iodide, either in the dehydrogenation zone or in a separate oxidation zone, by reaction with oxygen under conditions where the metal iodide is in a molten state. As disclosed in the copending U.S. application of Maxwell Nager, Serial No. 252,051, filed Jan. 17, 1963, now U.S. Patent 3,168,584, issued Feb. 2, 1965, this process is particularly adaptable to the conversion of isobutane to p-xylene. However, when the organic product stream is distilled to separate the xylene from unconverted isobutane and organic iodides which are present, it has been found that the organic iodides cause trouble. Furthermore, it has been found that in iodinative dehydrogenations of lower aliphatic hydrocarbons, especially of 4 to 5 carbon atoms, such as of n-butane to butadiene and of isopentane to isoprene in various processes such as described in U.S. 2,890,253 to Mullineaux et al. and in British Patent 895,500 to Baijle and Kwantes, similar troublesome organic iodides are produced. Distillation apparatus is plagued by plugging of the equipment due to polymer and/or coke formation. Much of this problem has been found to be due to the presence of vinyllic iodides, particularly dimethylvinyl iodide (DMVI) from isobutane and methylethylvinyl iodide from isopentane, in the product stream. The decomposition rate of, for example, DMVI is very high at temperatures above 325° F. and the compound decomposes very readily into elemental iodine and heavy polymers. Previous efforts to inhibit this decomposition reaction have been unsuccessful.

It is, therefore, a principal object of this invention to provide an improved process for iodinative dehydrogenation by stabilizing the by-product organic iodides formed during the iodinative dehydrogenation.

Now, in accordance with the present invention, it has been found that the subsequent treatment of the unsaturated hydrocarbon product stream produced in an iodinative dehydrogenation reaction can be improved and the economics greatly enhanced by inhibiting the by-product unsaturated organic iodide decomposition through injection of a nitrogenous base material into the product stream. When nitrogenous base is introduced into the product stream prior to distillation, wherein the temperature is in excess of 325° F., the decomposition of the unsaturated organic iodide, especially vinyllic iodides, is inhibited for a period of time sufficient to allow completion of the necessary separations.

Various nitrogenous bases may be used in the practice of this invention. For instance, ammonia, and primary aliphatic, cycloaliphatic, or aromatic amines are suitable for inhibiting the decomposition of the unsaturated organic iodides formed in the iodinative dehydrogenation reaction. Also suitable are secondary or tertiary amines, including cyclic amines such as pyridine, quinoline and the corresponding, more saturated compounds. The aliphatic polyamines, such as diethylenetriamine, ethylenediamine, and propanediamine-1,3 are particularly useful as are the aliphatic tertiary amines, with particular preference being given to ammonia as the nitrogenous base. In general it is preferred to use stable, readily distillable amines which contain only C, H and N atoms and only aminonitrogen atoms, and/or ammonia.

This invention can be applied to any phase of an iodinative dehydrogenation product recovery system where it is necessary to heat the iodine-containing streams. Application of the invention to the system prior to the gaseous product stream entering the distillation columns is particularly desirable, since this operation is one involving high temperatures. However, the invention is not to be construed as being limited thereto. When ammonia is the nitrogenous base it can be introduced with the product stream or injected at any point in the recovery system wherein the inhibition would be advantageous. Amines can also be added at any similar point in the recovery systems.

It has been found that any amount of nitrogenous base up to and including the amount necessary to saturate the liquid product stream is beneficial in inhibiting unsaturated organic iodide decomposition. When ammonia is the inhibitor the amount needed for saturation would be about 0.5% by weight. The nitrogenous base seems to inhibit the decomposition of the unsaturated organic iodides by creating an induction period wherein decomposition does not occur for a substantial period of time.

The organic material being iodinatively dehydrogenated in the system utilized in the practice of this invention is preferably a hydrocarbon. Saturated aliphatic compounds, including acyclic and alicyclic hydrocarbons, may be dehydrogenated to the corresponding unsaturates, which may be monoolefinic, diolefinic, polyolefinic and acetylenic, depending upon the relative proportions of the reactants, the particular conditions of temperature, pressure and contact time employed and the particular hydrocarbon used. It is preferred that the hydrocarbon contain more than 4 carbon atoms. It is unnecessary to start with fully saturated materials since partially unsaturated hydrocarbons may be further converted to form di- or polyunsaturates or aromatics. For example, butene-1 and butene-2 yield butadiene-1,3; isobutane yields isobutylene and p-xylene; n-butane yields a mixture of butenes and butadiene; isopentane yields a mixture of isopentenes and isoprene; n-hexane yields hexene and benzene; n-heptane and isoheptane yield toluene; 2,5-dimethylhexane yields para-xylene; 2,4-dimethylhexane yields m-xylene.

Both saturated and unsaturated hydrocarbon iodides may be formed. Other iodides sometimes formed in addition to the vinyllic iodides include iodomethane, iodobenzene, p-iodotoluene, and iodomethylnaphthalene; typical vinyllic iodides formed are vinyl iodide, 2-iodopropene, cis-1-iodopropene, trans-1-iodopropene, dimethylvinyl iodide, 2-iodobutene and methyl butadienyl iodide.

In order to gain an understanding of the possible function of ammonia and the amines in minimizing decomposition and polymerization during separation of the product mixture, the effect of ethylenediamine on the decomposition of dimethylvinyl iodide was determined. Table I illustrates the effect of the ethylenediamine content on the induction period, i.e., delay in decomposition, of dimethylvinyl iodide decomposition at 500° F.

Table I

| Percent volume ethylenediamine in test mixture: | Time to onset of decomposition, min. |
|---|---|
| 0.01 | <3 |
| 0.05 | 5–10 |
| 0.1 | 30 |
| 0.2 | >100* |
| 0.5 | 130–160 |
| 2.0 | >330 |

*Sample withdrawn after 100 minutes. No change was evident in the composition.

Similar results are obtained when diethylenetriamine is used in place of ethylenediamine.

The following specific examples of the invention will serve to more clearly illustrate the application of the invention, but are not to be construed as in any manner limiting the invention.

EXAMPLE I

A test mixture containing 12.5% by weight DMVI, 83.9% by weight p-xylene and 3.6% by weight toluene was saturated with ammonia (ca. 0.5%) by weight), sealed in a glass vessel and placed in an oven at 380° F. The ammonia-treated mixture was cooled after 91 hours. A GLC analysis revealed no change in the composition of the mixture.

EXAMPLE II

Another test mixture saturated with ammonia prepared as in Example I was retained at 500° F. for more than 1½ hours. The mixture was cooled and a GLC analysis thereof revealed no change in the composition.

EXAMPLE III

In a process as disclosed in copending U.S. application Serial No. 252,051 (U.S. 3,168,584) supra, molten lithium iodide/lithium hydroxide and oxygen and steam were passed in cocurrent downward flow through the upper section of a packed tower reactor wherein the oxygen, lithium iodide and steam reacted, releasing iodine and forming lithium hydroxide. This molten composition then passed downwardly into the dehydrogenation section of the reactor wherein a hydrocarbon stream of isobutane was introduced under conditions such that the isobutane was substantially converted by reaction with iodine to para-xylene. The effluent stream leaving the reactor comprised molten lithium iodide/lithium hydroxide, water vapor and the substantially dehydrogenated and dehydrocyclized product. Upon cooling and separating the total liquid product from the molten lithium iodide/lithium hydroxide effluent stream, the product was pumped to a deisobutenizer column wherein isobutylene was separated from the para-xylene by distillation. The pressure at the top of the column was 100 p.s.i.g., the top temperature was 125° F. and the reboiler temperature was about 360° F. 0.3% by weight of ammonia was injected into the feed stream to the deisobutenizer. Examination of the reboiler and column head after a run of 60 hours revealed no polymerization products. Distillation without the ammonia addition resulted in severe polymerization and attendant plugging of the equipment.

The instant invention has the additional advantages of permitting the design of smaller, higher pressure distillation columns to reduce capital cost. By operating the distillation columns at higher pressures, water-cooled condensers may be used, thereby additionally reducing capital outlay.

I claim as my invention:

1. In a process for the dehydrogenation of a first hydrocarbon to a second hydrocarbon wherein the first hydrocarbon is isobutane and the second hydrocarbon is selected from the group consisting of isobutylene and p-xylene, wherein said first hydrocarbon and iodine are reacted in a reaction zone at a temperature in excess of 300° C., whereby said second hydrocarbon and dimethylvinyl iodide are formed, the improvement consisting essentially of introducing a compound selected from the group consisting of ammonia and ethylenediamine into the product stream comprising said second hydrocarbon and dimethylvinyl iodide to inhibit the decomposition of said dimethylvinyl iodide.

2. In a process for the dehydrogenation of a first hydrocarbon to a second hydrocarbon wherein the first hydrocarbon is selected from the group consisting of butene-1 and butene-2 and the second hydrocarbon is butadiene-1,3, wherein said first hydrocarbon and iodine are reacted in a reaction zone at a temperature in excess of 300° C., whereby said second hydrocarbon and dimethylvinyl iodide are formed, the improvement consisting essentially of introducing a compound selected from the group consisting of ammonia and ethylenediamine into the product stream comprising said second hydrocarbon and dimethylvinyl iodide to inhibit the decomposition of said dimethylvinyl iodide.

References Cited

UNITED STATES PATENTS

| | | | |
|---|---|---|---|
| 1,151,255 | 8/1915 | Ferguson | 260—652.5 |
| 2,043,257 | 6/1936 | Missbach | 260—652.5 |
| 2,160,944 | 6/1939 | Coleman et al. | |
| 2,476,554 | 7/1949 | Lincoln et al. | 260—652.5 |
| 2,543,575 | 2/1951 | Harvey et al. | 260—652.5 |
| 2,863,851 | 12/1958 | O'Brien | 260—652.5 XR |
| 2,900,421 | 8/1959 | Kharasch | 260—655 |
| 3,119,881 | 1/1964 | Hodgson | 260—683.3 |
| 3,168,584 | 2/1965 | Nager | 260—656 XR |
| 3,207,809 | 9/1965 | Bajars | 260—683.3 |
| 3,227,766 | 1/1966 | Kruse et al. | 260—652.5 XR |

LEON ZITVER, *Primary Examiner.*

K. V. ROCKEY, T. G. DILLAHUNTY,
*Assistant Examiners.*